US011435315B2

(12) United States Patent
Gahlings et al.

(10) Patent No.: US 11,435,315 B2
(45) Date of Patent: Sep. 6, 2022

(54) SMART SENSOR SYSTEM

(71) Applicant: ANB Sensors Limited, Cambridge (GB)

(72) Inventors: Steven A. Gahlings, Cambridge (GB); Nathan Lawrence, Hail Weston (GB)

(73) Assignee: ANB Sensors Limited, Cambridge (GB)

( * ) Notice: Subject to any disclaimer, the term of this patent is extended or adjusted under 35 U.S.C. 154(b) by 106 days.

(21) Appl. No.: 16/769,555

(22) PCT Filed: Dec. 6, 2018

(86) PCT No.: PCT/EP2018/083864
§ 371 (c)(1),
(2) Date: Jun. 3, 2020

(87) PCT Pub. No.: WO2019/110756
PCT Pub. Date: Jun. 13, 2019

(65) Prior Publication Data
US 2021/0215637 A1     Jul. 15, 2021

(30) Foreign Application Priority Data
Dec. 6, 2017 (GB) ...................................... 1720353

(51) Int. Cl.
*G01N 27/416* (2006.01)
*G01N 27/30* (2006.01)
(Continued)

(52) U.S. Cl.
CPC ....... *G01N 27/4163* (2013.01); *G01N 27/301* (2013.01); *G01N 27/333* (2013.01);
(Continued)

(58) Field of Classification Search
CPC .. G01N 27/301; G01N 27/302; G01N 27/333; G01N 27/4035; G01N 27/4163;
(Continued)

(56) References Cited

U.S. PATENT DOCUMENTS 5,223,117 A     6/1993  Wrighton
6,834,560 B1 *  12/2004 Brundage ............... E21B 47/01
                                                        248/230.7
(Continued)

FOREIGN PATENT DOCUMENTS

GB         2 559 619 A       8/2018
WO    WO 2010 104962 A1 *   9/2010  ............. G01N 27/30
(Continued)

OTHER PUBLICATIONS

Kissinger et al., "Electrochemistry for the Non-Electrochemist," Current Separations 20:2 (2002) (Year: 2002).*
(Continued)

*Primary Examiner* — Alexander S Noguerola
(74) *Attorney, Agent, or Firm* — Kilpatrick Townsend & Stockton LLP

(57) ABSTRACT

A smart sensor system is provided which uses a monitoring electrode to produce a calibration output that can be used in-situ and in real-time to monitor and address reference electrode drift and to provide information regarding sensor operation. The monitoring electrode uses a redox chemistry that is either a non-active redox species that is not sensitive to changes in a solution being tested/monitored or a redox active species that sets a pH of the local environment proximal to the electrode when the electrode is contacted with a test and/or reference solution. The smart sensor system includes at least one of a solid-state electrochemical sensor; a glass electrode, a reduction oxidation sensor; and/or a glucose sensor and/or a sensor to monitor constituent parts of the solution composition.

20 Claims, 1 Drawing Sheet

(51) Int. Cl.
*G01N 27/333* (2006.01)
*G01N 27/48* (2006.01)
*G01N 27/403* (2006.01)

(52) U.S. Cl.
CPC ..... *G01N 27/4035* (2013.01); *G01N 27/4165* (2013.01); *G01N 27/4167* (2013.01); *G01N 27/48* (2013.01)

(58) Field of Classification Search
CPC ............. G01N 27/414; G01N 27/4167; G01N 27/4166
See application file for complete search history.

(56) References Cited

U.S. PATENT DOCUMENTS

| | | | |
|---|---|---|---|
| 2005/0148832 A1* | 7/2005 | Reghabi | A61B 5/412 600/309 |
| 2013/0213807 A1 | 8/2013 | Hanko | |

FOREIGN PATENT DOCUMENTS

| | | |
|---|---|---|
| WO | 2017/208029 A1 | 12/2017 |
| WO | 2018/146543 A1 | 8/2018 |

OTHER PUBLICATIONS

Online article "What is Voltammetry? Types and Applications" by Harry Robson at https://www.ossila.com/pages/voltammetry, downloaded Dec. 17, 2021 (Year: 2021).*

International Search Report and Written Opinion for International Application No. PCT/EP2018/083864, dated Apr. 18, 2019. (10 pages).

Xiangming Gao et al, "An Electrochemical Method for Monitoring the Acidity of Water for Fuel Cell and Environmental Applications", Energy Technology, vol. 6, No. 1, Nov. 13, 2017 (Nov. 13, 2017), p. 94-99.

* cited by examiner

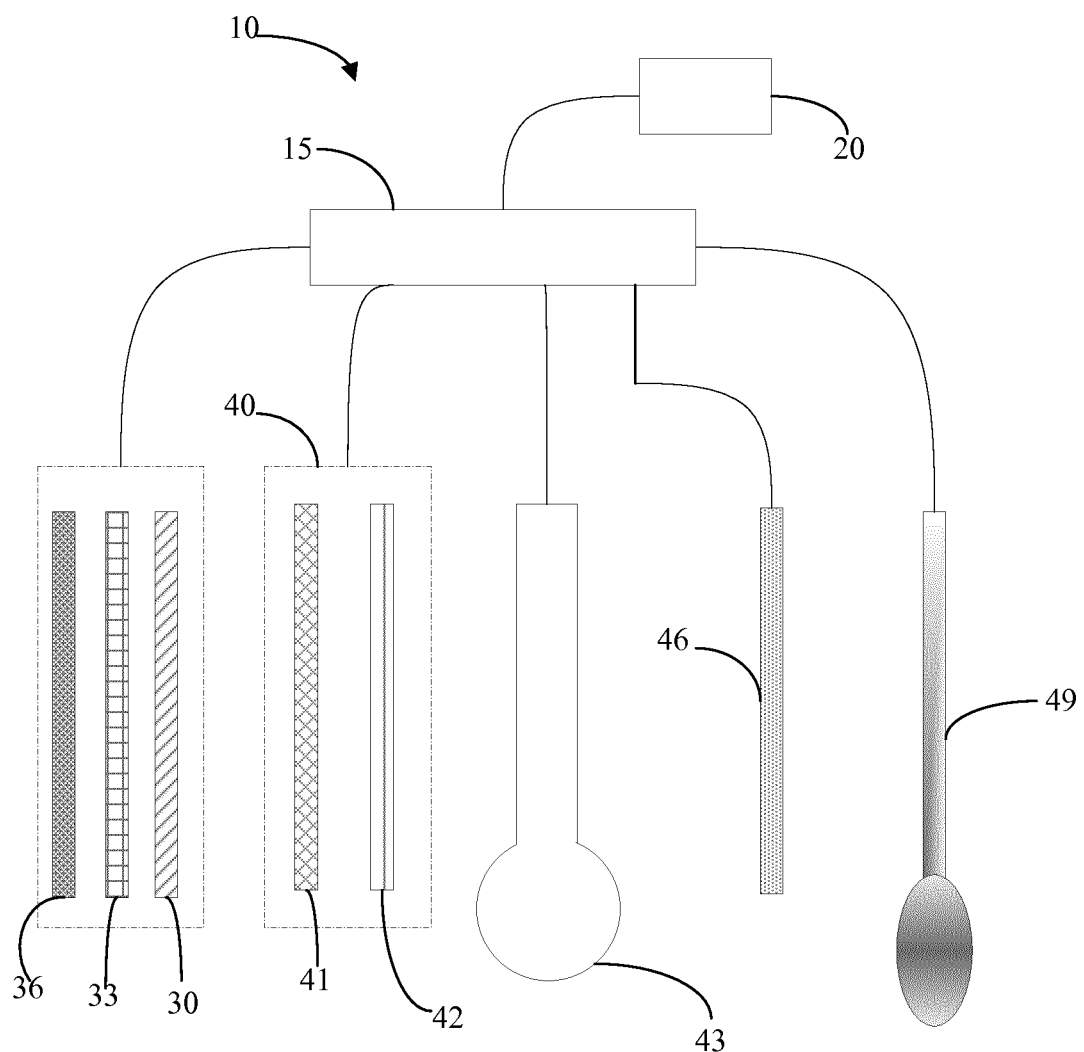

SMART SENSOR SYSTEM

CROSS-REFERENCES TO RELATED APPLICATIONS

This application is a U.S. National Stage of International Application No. PCT/EP2018/083864, filed Dec. 6, 2018, which claims the benefit of Great Britain Patent Application No. 1720353.0 filed on Dec. 6, 2017; the entire disclosures of all are hereby incorporated by reference in their entireties into the present disclosure for all purposes.

BACKGROUND

Embodiments of the present application provide sensors, in particular smart medical and/or pharmaceutical sensors, with a stable reference and/or reference correction. More particularly, but not by way of limitation, the present application describes sensor systems comprising a monitoring electrode that is configured to monitor sensor operation to provide for accurate/precise sensor measurements.

In chemistry, pH is a numeric scale used to specify the acidity or basicity (alkalinity) of an aqueous solution. It is approximately the negative of the logarithm to base 10 of the molar concentration, measured in units of moles per liter of hydrogen ions. More precisely, it is the negative of the logarithm to base 10 of the activity of the hydrogen ion. Solutions with a pH less than 7 are acidic and solutions with a pH greater than 7 are basic. Pure water is neutral, being neither an acid nor a base.

pH measurements are important in a variety of fields such as healthcare, medical, pharmaceutical, environmental, industrial, and many more. In addition to pH, other important measurements often need to be taken in these fields. For instance in medical/pharmaceutical applications it is often necessary to also measure oxygen-reduction potential, glucose concentration and/or the like. There are several problems in making sensor measurements, including monitoring/controlling sensor operation in-situ. Moreover, in-situ monitoring and controlling sensor operation without manual intervention is often a requirement in these fields. In-situ, monitoring and control is important, because in any of the above fields, it may not be possible/practicable to remove a sensor to monitor and control its operation, or it may simply be advantageous for the sensor to be able to remain in a single location for long periods of time. For example, in the pharmaceutical field, testing may be performed on cells, cell cultures and/or the like in a controlled environment, which environment may not be kept integral by the removal/adjustment of sensors. Similarly, in the medical field, for example for point-of-care applications, for monitoring applications and/or the like, it may not be possible to remove sensors for operation purposes after sensing procedures, point-of-care or monitoring procedures have commenced.

The issue of monitoring/control of sensors is enhanced in all the aforementioned fields, by the need for accurate, precise measurements that may be required to be made over a period-of-time, whilst the sensor is deployed, for example for a medical/pharmaceutical procedure. Furthermore, an understanding of how the sensor is operating in real-time is required to provide that tests do not have to be repeated, which is costly, and/or may not even be possible. Real-time updates also prevent the need for repeated access to the sensors which may be time consuming and costly when located remotely, or even a cause for discomfort when the sensors are used in medical applications.

Furthermore, with respect to pH measurements, there are a number of issues that make measuring pH using existing sensors problematic in the aforementioned fields. These problems include, fragility and reference drift of glass electrode pH sensors and instability of the reference used for voltammetric pH measurement. For both the glass electrode and the voltammetric based pH sensors, use in low buffering capacity solutions, such as many saline solutions used in the healthcare, medical and/or pharmaceutical fields, or water/seawater often found in environmental studies, may adversely affect pH measurement. Moreover, the reference drift found in glass electrodes is also problematic for other sensors used in the aforementioned fields. For example, a number of sensors such as glucose sensors, reduction-oxidation potential sensors and/or the like use a reference electrode, often a silver-silver chloride reference electrode, that is prone to drift. This drift is well-known and is caused, at least in part, by an exchange of liquids into and out of the reference chamber.

For nearly a century, pH has most commonly been measured using a glass electrode. The glass electrode is a combination electrode that combines both a glass and a reference electrode into one body. The combination electrode consists of the following parts: a sensing part of the electrode, a bulb made from a specific glass; an internal electrode, usually silver chloride electrode or calomel electrode; an internal solution, usually a 3M and/or saturate KCl gel and/or aqueous solution; a reference electrode, usually the same type with a reference internal solution, usually 3M and/or saturate KCl gel and/or aqueous solution; a junction with studied solution, usually made from ceramics or capillary with quartz fiber; and the body of the electrode, made from non-conductive glass or plastics.

Glass electrodes cannot be used for many applications in the aforementioned fields because of their fragility, requirement of calibration before use, need for calibration during use, and need to be stored under appropriate conditions, such as the requirements that the sensor be stored wet.

A number of chemical analysis tools for pH monitoring are known from chemical laboratory practice. Such known analysis tools include, for example various types of chromatography, electrochemical and spectral analysis. Of the analysis tools, the potentiometric method has been widely used for the measurements of water composition both in the laboratory and in the field of ground water quality control.

U.S. Pat. No. 5,223,117 (Wrighton) discloses a two-terminal voltammetric micro-sensor having an internal reference using molecular self-assembling to form a system in which the reference electrode and the indicator electrode are both on the sensor electrode. The reference molecule is described as a redox system that is pH-insensitive, while the indicator molecule is pH sensitive and is formed by a hydroquinone based redox system having a potential that shifts with the pH. Both, reference molecule and indicator molecule layers are prepared by self-assembly on gold (Au) microelectrodes. In the known micro-sensor of Wrighton, a pH reading is derived from analysis of peak readings of the voltammograms, i.e., the shift of the peak reading obtained from the pH sensitive indicator molecule (often referred to as the redox active species).

Recently there has been significant work in the development of pH sensors for use in the water industry, where the concentration of dissolved buffer and/or ionic salt is low. Interest in this area stemmed from the work by Compton et al. (see C. Batchelor-McAuley, B. R. Kozub, D. Menshkau, R. G. Compton, *Voltammetric Responses of Surface-Boundary and Solution-Phase Anthraquinone Moieties in the Pres-* ence of Unbuffered Aqueous Media, J. Phys. Chem. C 115, pp. 714-718 (2011)), who showed the use of classical quinone/hydroquinone voltammetry to monitor pH in these systems failed. Compton established that the proton coupled electrochemical process perturbed the pH of the solution locally to the electrode when little or no buffer and/or ionic salt was in the analyte solution.

To this end, work by Dr. Nathan Lawrence has shown that this issue can be mitigated by the use of a variety of quinone and phenol based systems, which provide a means of internal hydrogen bonding of the proton being transferred in the electrochemical process. In this work, it was shown that dihydroxyanthraquinone and alizarin were suitable for the quinone systems, where the keto moiety closest to the —OH moiety allowed the facilitation of the proton coupled electron transfer and providing a means for the reaction to follow a concerted rather than non-concerted mechanism. Further to these results, it was shown that oxidation of phenol species containing moieties holding keto groups in the 2-position of the benzene ring, e.g., salicyaldehyde, provided an electroactive polymer species that is pH active and able to measure pH in low buffered media/ionic strength, such as water/seawater. A variety of derivatives were tested by Lawrence and described in U.S. Patent Publication No. 2014/0332398, including the aldehyde, ester and nitrogen based compounds. From further work, Lawrence found that phenolic compounds including a sulphurous atom attached either directly or indirectly to the aromatic ring of the phenolic compound and configured to form a hydrogen bond with the hydrogen atom associated with the hydroxyl moiety of the phenolic compound, provided a stable redox active species for voltammetric measurement of pH in solutions with a low buffering capacity, such as saline solutions or the like used in healthcare, medical and/or pharmaceutical applications.

SUMMARY

Embodiments of the present disclosure provide a smart sensor system for use in a variety of different fields, in particular enviromental, industrial healthcare, medical and/or pharmaceutical. The sensor system comprises a monitoring electrode, which may be held within a reference electrode chamber and thus form a smart reference electrode, wherein the monitoring electrode is configured to produce a calibration output that can be used in-situ and in real-time to monitor and address reference electrode drift and to provide information regarding sensor operation. This monitoring electrode/smart reference electrode when used with a solid-state electrochemical sensor, provides a calibration output that may be used as the reference value for the solid-state electrochemical sensor. In embodiments of the present disclosure, the monitoring electrode comprises a redox chemistry that comprises either a redox species that is not sensitive to changes in a solution being tested/monitored and/or a redox active species configured to set a pH of the local environment proximal to the electrode when the electrode is contacted with a test solution.

In addition to the monitoring electrode, the smart sensor system comprises at least one sensor, for example an electrochemical sensor for detecting and monitoring pH of liquids; a glass electrode, an oxidation-reduction potential sensor; a glucose sensor and/or other ion selective electrode sensor.

In some embodiments, a voltammetric signal is applied to the monitoring electrode to generate a response signal from the monitoring electrode. Because the monitoring electrode is either insensitive to changes in the test solution or configured to set the pH proximal to the electrode, the response signal comprises a voltammetric response with a constant peak voltage, as well as other constant features in the voltammetric response. In embodiments of the present application, a difference between the constant peak voltage and a reference voltage of a reference system associated with the at least one of the sensors of the sensor system, may be determined and then used to correct any drift of the reference system. For example, the difference between the constant peak voltage and the reference voltage may be measured when the sensor using the reference system is calibrated, may be determined by batch testing, may be calculated based upon the characteristics of the reference system and/or the like.

In some embodiments, the voltammetric signal may be applied between the monitored reference electrode and one or more electrodes of at least one of the electrochemical sensors. The voltammetric response produced in response to a voltammetric signal applied between the monitored reference electrode and the electrode of one of the sensors of the sensor system may be processed to provide real-time, in-situ data regarding operation of the one of the sensors.

In some embodiments, such as where the sensor in the sensor system comprises an electrochemical sensor, the monitoring electrode may comprise the reference electrode for the sensor, where the constant peak voltage is used as a reference voltage for the sensor.

In some embodiments, where the sensor system comprises an electrochemical sensor the electrochemical sensor may comprise a plurality of working electrodes, a working electrode comprise a plurality of areas on the working electrode comprising a redox active species and/or a working electrode comprising an array of microelectrodes. In some embodiments of the present disclosure, the sensor system may control the electrochemical sensor to switch between working electrodes, areas on the working electrode comprising a redox active species and/or electrodes in the microelectrode array when a signal produced by the working electrode is too small and/or too noisy to process.

In some embodiments, where the sensor system comprises a glass electrode, a voltammetric signal may be applied between the monitoring electrode and the reference electrode and/or between the monitoring electrode and the working electrode of the glass electrode. The voltammetric response produced by applying a voltammetric signal between the monitoring electrode and the reference electrode may determine any drift in the reference electrode, may identify breakdown of the reference electrode and/or the reference solution, may identify entry of contamination into the reference solution, may identify dilution of the reference solution and/or the like. The voltammetric response produced by applying a voltammetric signal between the monitoring electrode and the working electrode may provide information regarding the glass electrode membrane and other operational characteristics of the glass electrode.

In some embodiments, when used in the pharmaceutical field, an immobilized redox species is held either within or upon a sensing electrode to determine the cellular condition of cells, such as liver cells, when exposed to various drugs/pharmaceuticals. In such embodiments, sensors may measure the properties of a solution containing the cells and/or the cells themselves. For purposes of this application both the solution containing the cells and the solution contained within the cells may be referred to as a test solution. In some embodiments, sensors may be used to measure key markers of cell condition, such as pH, oxygen/reduction potential, glucose concentration and/or the like. A knowledge of these three parameters provides an insight into the behavior and healthiness of the cells.

In some embodiments, a plurality of electrochemical based sensors may be tied to a single smart reference electrode. The smart reference electrode is designed to overcome issues of electrode drift, by providing in-situ calibration. In some embodiments, algorithms are used to provide a sensor made smart where measurement parameters can be altered in line with any measured changes in reference electrode potential.

BRIEF DESCRIPTION OF THE DRAWINGS

FIG. 1 illustrates a smart sensor comprising a monitoring electrode, in accordance with some embodiments of the present disclosure.

DESCRIPTION

The ensuing description provides some embodiment(s) of the invention, and is not intended to limit the scope, applicability or configuration of the invention or inventions. Various changes may be made in the function and arrangement of elements without departing from the scope of the invention as set forth herein.

Some embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the FIGURE and may start or end at any step or block. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages or any combination thereof. When implemented in software, firmware, middleware or microcode, the program code or code segments to perform the necessary tasks may be stored in a machine-readable medium such as storage medium. A processor(s) may perform the necessary tasks. A code segment may represent a procedure, a function, a subprogram, a program, a routine, a subroutine, a module, a software package, a class or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded or transmitted via any suitable means including memory sharing, message passing, token passing, network transmission, etc.

Reference will now be made in detail to embodiments, examples of which are illustrated in the accompanying drawings and FIGURES. In the following detailed description, numerous specific details are set forth in order to provide a thorough understanding of the subject matter herein. However, it will be apparent to one of ordinary skill in the art that the subject matter may be practiced without these specific details. In other instances, well known methods, procedures, components, and systems have not been described in detail so as not to unnecessarily obscure features of the embodiments. In the following description, it should be understood that features of one embodiment may be used in combination with features from another embodiment where the features of the different embodiment are not incompatible.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step. The first object or step, and the second object or step, are both objects or steps, respectively, but they are not to be considered the same object or step.

The terminology used in the description of the disclosure herein is for the purpose of describing particular embodiments only and is not intended to be limiting of the subject matter. As used in this description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting", depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of the present disclosure provide a smart sensor system for sensing properties of solutions, in particular, low buffering capacity solutions. The sensor system has applications in the healthcare, medical and pharmaceutical fields, where low buffer capacity solutions, such as saline type solutions and/or the like, may be monitored in controlled environments and/or environments where intervention to maintain/calibrate sensors may not be possible and/or may be detrimental.

By way of example, in the healthcare/medical fields, sensors may be used to monitor properties of a patient's bodily fluids, which may be done directly or using sampling/bypass flows and/or the like. Very often, the fluid flows being monitored/tested may comprise low buffering capacity solutions, such as saline solutions or the like. In the pharmaceutical industry, cell cultures may be grown, cell models may be produced (such as stem-cell based somatic cell models) and pharmaceuticals may be applied to the cells to test the effect of the pharmaceuticals on the cells. To test the effects of the pharmaceuticals, sensors may measure changes in properties of a solution in which the cells are submersed. To measure changes in properties the sensor must be precise to determine small changes in solution properties.

FIG. 1 illustrates a smart sensor system for sensing properties of a solution, in particular, a low buffer capacity solution, in accordance with some embodiments of the present disclosure.

In FIG. 1, a smart sensor system 10 comprises a monitoring electrode 30, which may be configured to contact a solution being monitored/tested. In some embodiments of the present disclosure, the monitoring electrode 30 may comprise a chemical species that is configured to set a pH of the reference solution being tested. For example, the chemical species may comprise a chemical structure, moieties and/or the like that is acidic or alkaline in nature, e.g., the chemical species may comprise an acid or a base and/or comprise acidic or basic moieties.

In some embodiments, the monitoring electrode 30 may comprise a redox species that is configured so that a redox potential produced by the redox species does not change with changes to the test solution, such as changes in ion concentration, pH and/or the like. Such embodiments, unlike embodiments where the monitoring electrode 30 sets the pH of the test solution local to the monitoring electrode 30, do not require use in low buffering capacity solutions.

In some embodiments of the present disclosure using a redox active species, the monitoring electrode 30 comprises a redox species configured to undergo reduction/oxidation when an electronic signal is applied to the redox species, where the redox species is sensitive to the present of hydrogen ions.

In some embodiments of the present application, the redox species may be an inactive redox species, where the non-active redox species generates a redox potential that is independent of changes to the test solution, such as changes in ion concentration, pH concentration, ion speciation and/or the like. For purposes of this application, a redox species that generates a redox potential that is independent of changes to the test solution, such as changes in ion concentration, pH concentration, ion speciation and/or the like may be referred to as an "inactive redox species" because it is not active with respect to the properties of the test solution or "an active redox species that is insensitive" because the redox species produces a redox response, but the response is not sensitive to the properties of the test solution. In some embodiments, the non-active redox species may be an active redox species that is insensitive to hydrogen ion concentration/pH.

In some embodiments, the redox species is used to set the pH local to the monitoring electrode 30. The chemical species/the redox species if it is acidic or basic in nature sets the pH local to the monitoring electrode 30. This is particularly effectively when the test solution has a low buffering capacity. For some embodiments of the present application, any redox species sensitive to the presence of hydrogen ions that has acidic or basic properties, such as attached acid or base moieties, may be used on the monitoring electrode 30. However, in some embodiments redox species that are acids, such as salicylic acid and/or the like, or bases, such as an amine derivate and/or the like, may comprise the redox active species of the monitoring electrode 30.

In embodiments of the present application, the monitoring electrode 30 may comprise an electrode substrate:
 (a) modified with a chemical species that is redox active and generates a redox potential that is independent of changes to the test solution, such as changes in ion concentration, pH concentration, ion speciation and/or the like;
 (b) modified with a redox active species that exerts a passive control over the environment local to the monitoring electrode 30, for example the redox active species may comprise a redox active center attached to moieties, such as carboxylate molecules, where the local environment of the test solution has a pH consistent with the logarithmic acid dissociation constant (pKa) of the moieties attached to the redox active center; and
 (c) modified to achieve a redox active center which exerts a triggered control over the local environment of the monitoring electrode 30, where the triggered control may be provided by the release or uptake of protons during an electrochemical sweep applied to the monitoring electrode 30 making the local environment either acid or basic in nature. This non-obvious route can facilitate the use of pH active compounds as reference species by using the correct chemistry and an understanding of the environment in which the sensor will be immersed In some embodiments of the present disclosure, the redox species comprises anthraquinone, an anthraquinone derivative, a quinone derivative and/or the like. Anthraquinone has been found to set the local pH of the test solution proximal to the monitoring electrode 30 to a pH of 10 or more. Moreover, anthraquinone, anthraquinone derivatives, quinone, carbonyl derivatives have been found to be stable redox species that provide a constant/stable response over long durations of contact with the test solution and/or repeated application of electronic signals.

In some embodiments of the present disclosure, the monitoring electrode 30 comprises an electrode substrate coupled with the redox species. The redox species may be immobilized on the electrode substrate. Such immobilization may in some embodiments comprise: solvent casting the redox species onto the electrode substrate; screen-printing the redox species onto the electrode substrate; mixing the redox species with a conducting powder or the like and containing the mixture in a cavity or the like in the electrode substrate; creating a paste of the redox species and a conducting material and disposing the paste in a cavity in or on the surface of the electrode substrate; covalently bonding the redox species with the electrode substrate; chemically and/or physically treating the surface of the electrode; and/or the like. In some embodiments, the electrode substrate may comprise carbon, a carbon derivative and/or the like. In some embodiments, the monitoring electrode 30 may comprise a carbon or carbon derivative substrate with an active surface, wherein the active surface comprises the redox species. Merely by way of example, the substrate may comprise carbon and a surface of the carbon may have been treated to create an active surface comprising redox active moieties or the like.

In some embodiments, the monitoring electrode 30 is part of an electrochemical cell comprising a counter electrode 33 and/or a reference electrode 36. In some embodiments, the smart sensor system 10 may comprise a control unit 15. The control unit 15 may comprise both an electrical source and a sensor providing for both generating an electrical signal and measuring a response to application of the generated electrical signal. The control unit 15 may comprise a potentiostat and/or an apparatus such as a power supply, voltage supply, or current supply for applying an electrical signal/potential and a detector, such as a voltmeter, a potentiometer, ammeter, resistometer or a circuit for measuring voltage and/or current and converting to a digital output, for measuring a response to the applied electrical signal.

In some embodiments of the present disclosure, the control unit 15 may apply an electrical signal to the monitoring electrode 30. This application of the electrical signal to the monitoring electrode 30 may comprise sweeping a voltage difference between the monitoring electrode 30 and at least one of the counter electrode 33 and the reference electrode 36. In some embodiments of the present disclosure, the control unit 15 provides a voltammetric signal/voltammetric sweep between the monitoring electrode 30 and at least one of the counter electrode 33 and the reference electrode 36. The voltammetric sweep may comprise a linear sweep, a cyclic sweep, an elliptical sweep and or a square wave sweep.

In embodiments of the present disclosure, a response of the monitoring electrode 30 to the applied electronic signal is measured by the control unit 15 and processed by processing circuitry 20.

The processing circuitry 20 may in some aspects process a voltammetric response, such as a voltammogram, of the monitoring electrode 30. The voltammetric response of the monitoring electrode 30, because it comprises a redox species sensitive to hydrogen ions in the test solution comprises a peak voltage that is dependent on the pH of the local environment of the test solution. Since the redox species and/or the chemical species coupled with the monitoring electrode 30 sets the local species, the peak voltage of the voltammetric response is a constant value that depends upon the local pH set by the redox species and/or the chemical species. Moreover, the whole voltammetric response including the peak voltage, absent noise etc., is a constant.

In some embodiments of the present disclosure, the smart sensor system 10 comprises at least one of a voltammetric pH sensor 40, a glass electrode 43, an oxidation-reduction potential sensor 46 and a glucose sensor 49. In embodiments of the present disclosure, the voltammetric pH sensor 40, the glass electrode 43, the oxidation-reduction potential sensor 46 and/or the glucose sensor 49 are in electronic communication with the control unit 15 and/or the processing circuitry 20.

Solid-State pH Sensor

In some embodiments, the voltammetric pH sensor 40 may comprise a solid-state sensing electrode 41 modified with a redox active species capable of undergoing both electron and proton transfer. On applying a potential to the sensing electrode 41, a measured potential (peak potential, half-wave potential, onset potential etc.) generated in response to the applied potential provides a measure of the pH of the test solution.

In some embodiments, the electrode potential applied to the sensing electrode 41 may be swept linearly, step-wise or via a pulse technique and the current recorded. Where the monitoring electrode 30 comprises a inactive redox species, the test solution may comprise a solution with buffering capacity and the redox active species may comprise: quinone/benzoquinone, phenol based polymers, anthraquinone, napthaquinone, bare carbon, carbon with an active surface and/or the like. In embodiments where the monitoring electrode 30 comprise a redox active species sensitive to hydrogen ion concentration, the test solution to be measured should comprise a low buffering capacity solution, such as water, a saline solution and/or the like, and the monitoring electrode 30 may comprise an acidic redox active species, a basic redox active species, anthraquinone, an anthraquinone derivative, a quinone, a quinone derivative, a carbon substrate with a low volume of redox active centers derivatized thereon and/or the like.

In some embodiments of the present disclosure, when used in medical/pharmaceutical applications, the peak potential response of the redox species can be selected such that it is in a range where common medical interferences, such as paracetamol etc., are not redox active and where the reduction of oxygen to generate peroxide, which may have an adverse effect on cellular activity, is not catalyzed.

In some embodiments, a voltammetric signal is applied to the sensing electrode 41 to determine the pH of the test solution. In embodiments of the present disclosure, the monitoring electrode 30 may be used as a reference potential for the sensing electrode 41. In some embodiments, the voltammetric signal may be swept between the sensing electrode 41 and the reference 36. In some embodiments, the voltammetric signal may be swept between the sensing electrode 41 and a counter electrode 42, with the monitoring electrode 30 monitoring the reference potential of the common reference electrode 36.

As described above, the monitoring electrode 30 either comprises an inactive redox species or a redox species that sets the pH of a test solution. In both cases, the monitoring electrode sets a constant, drift free peak potential that can be used as a reference for the voltammetric pH sensor 40, removing any need to manually calibrate the voltammetric pH sensor 40 during use. For example, the processing circuitry 20 may process peak voltage separation between the peak voltage from the sensing electrode 41 and the peak voltage from the monitoring electrode 30 to determine a pH of the test solution.

Some embodiments of the present disclosure, provide a smart pH sensor wherein a wave shape of a voltammetric response to a voltammetric signal applied to the sensing electrode 41 and the monitoring electrode 30 provides information in-situ and in real-time regarding operation of the voltammetric pH sensor 40. For example, peak current, peak height, symmetry of the wave etc., provide information on sensor performance and/or when sensors accuracy is failing. In certain embodiments, the voltammetric pH sensor 40 may comprise: a plurality of sensing electrodes, a sensing electrode comprising a plurality of redox active areas which are individually addressable, a sensor array and/or the like. In such embodiments, when sensor performance/accuracy is diminishing, as determined from the voltammetric response, the control unit 15 and/or the processing circuitry may, without a requirement for manual intervention, switch to a new sensing electrode/redox active area. Similarly, if the peak voltage from the monitoring electrode 30 changes beyond a preset value, the control unit 15 and/or the processing circuitry may, without a requirement for manual intervention, switch to a new monitoring electrode, redox inactive area, redox active area that sets local pH and/or the like.

In embodiments, where multiple monitoring electrodes and/or sensitive electrodes are provided, such as comprising an array of individually addressable electrodes, the sensor system 10 has redundancy built into the system, which increases sensors lifetime and provides for in-situ maintenance without manual intervention.

Glass Electrode

In some embodiments, the smart sensor system 10 may comprise a glass electrode 43. Glass electrodes are the most common sensor used to measure pH. However, glass electrodes suffer from reference drift as the reference electrode is contained in a reference chamber in a reference solution behind a porous frit, where the concentration of the reference solution changes as fluid passes into or out of the chamber through the porous frit.

In some embodiments of the present disclosure, the processing circuitry 20 may determine a difference between a reference potential of the reference electrode of the glass electrode 43 and a peak potential of the monitoring electrode 30. This difference may be determined when the glass electrode is manually calibrated, at the start of the testing procedure, from batch processing of smart sensor systems, from calculated potentials and/or the like. In embodiments of the present disclosure, the reference potential is periodically compared by the processing circuitry 20 with the peak potential of the monitoring electrode 30 and if there is any change in this difference the processing circuitry 20 is configured to recalibrate the glass electrode 43 in-situ, with no manual intervention.

In some embodiments, a voltammetric signal may be applied between the monitoring electrode 30 and a reference electrode and/or a working electrode of the glass electrode. The voltammetric response produced by applying a voltammetric signal between the monitoring electrode 30 and the reference/working electrode may determine any drift in the reference electrode potential, may identify breakdown of the reference electrode and/or the reference solution, may identify entry of contamination into the reference solution, may identify dilution of the reference solution and/or the like. In some embodiments, the voltammetric response produced by applying a voltammetric signal between the monitoring electrode and the working electrode may provide information regarding the glass electrode membrane and other operational characteristics of the glass electrode.

Oxidation-Reduction Potential Sensor

Oxidation-Reduction Potential (ORP) is a measurement that indicates the degree to which a substance is capable of oxidizing or reducing another substance. ORP is measured in millivolts (mv) using an ORP meter/sensor. A positive ORP reading indicates that a substance is an oxidizing agent. The higher the reading, the more oxidizing the substance. As such, a substance with an ORP reading of +400 my is 4 times more oxidizing than a substance with an ORP reading of +100 mv. A negative ORP reading indicates that a substance is a reducing agent. Here, the lower the ORP reading, the more anti-oxidizing the substance. As such, a substance with an ORP reading of −400 my is 4 times more anti-oxidizing than a substance with an ORP reading of −100 mv. Most types of water, including tap water and bottled water, are oxidizing agents as their ORP value is positive. Alkaline ionized water is an anti-oxidizing agent, as it has a negative ORP value and it is able to donate extra electrons to neutralize the harmful effects of free radicals on the body. Most other types of water are oxidizing agents as their ORP is positive.

In some embodiments of the present application, oxidation-reduction potential sensor 46 comprises a potentiometric based sensor comprising a working electrode, which may comprise a metal, such as a platinum or the like, held at zero (0) current. The change in the electrical signal, such as the potential, applied to the working electrode to hold the current at zero provides a measure of the oxidation-reduction potential of the test solution. In embodiments of the present disclosure, the potential applied to the working electrode is periodically compared to the peak potential of the monitoring electrode 30. In some embodiments, the difference between the working electrode potential and the monitoring electrode 30 peak potential is initially made when the oxidation-reduction potential sensor 46, at the start of testing, from batch processing, from calculation and/or the like and the periodic monitoring is used to provide for in-situ calibration of the oxidation-reduction potential sensor 46.

Glucose Sensor

In some embodiments, the smart sensor system 10 comprises the glucose sensor 49. The glucose sensor 49 uses a mediated electrode, comprising an electrode with a glucose oxidase based enzyme. The glucose sensor 49 further comprises a sensing electrode modified with an electrochemically active species capable of oxidizing the glucose oxidise enzyme, which electrochemically active species typically undergo a single electron transfer reaction. The glucose sensor 49 measure the glucose concentration of the test solution through either an amperometric or a voltammetric response to an electrical signal applied to the sensing electrode. In an amperometric based system, the potential of the glucose sensing electrode is held at an oxidizing potential that is sufficiently high to catalyze the reaction process. In embodiments, of the present application this potential is measured/calibrated with respect to the peak voltage of the monitoring electrode 30. In a voltammetric based system, a reference peak and/or a peak in the voltammetric response of the glucose sensitive electrode may be compared to the peak potential to determine glucose concentration and/or to calibrate the glucose sensor 49. In some embodiments, a voltammetric signal may be swept between at least one of the electrodes of the glucose sensor 49 and the monitoring electrode 30 to generate a voltammetric response. From this voltammetric response, such as peak height, peak shape, peak width and/or the like, the processing circuitry can process mediator decay, enzyme decay/loss in activity and/or the like.

Additional Sensors

In some embodiments, the smart sensor system comprises any sensor (or a plurality of sensors) which are susceptible to reference electrode drift caused by the local environment. These may extend to sensors used for environmental applications, water monitoring systems, or the like.

It should be noted that whilst reference has been made to operation of the smart sensor system in particular with low buffering capacity test solutions, the smart sensor system is not limited to use with such solutions, and would be suitable for use with test solutions of other buffering capacities.

While the principles of the disclosure have been described above in connection with specific apparatuses and methods, it is to be clearly understood that this description is made only by way of example and not as limitation on the scope of the invention.

The invention claimed is:

1. A sensor system for sensing at least one property of a test solution, comprising:
 a monitoring electrode comprising a redox species and configured to produce a stable redox potential to an applied voltammetric signal when contacted with the test solution;
 a test sensor for measuring a property of the test solution; and
 processing circuitry in communication with the monitoring electrode and the test sensor and configured to use the stable redox potential to calibrate the test sensor, wherein the monitoring electrode is held within a reference solution held in a reference electrode and wherein an entirety of the reference electrode is placed in the test solution.

2. The sensor system of claim 1, wherein the stable redox potential is used to calibrate the test sensor by monitoring a potential difference between the stable redox potential of the monitoring electrode and a reference voltage of the test sensor.

3. The sensor system of claim 1, wherein the redox species comprises an inactive redox species that is insensitive to a concentration of the test solution or a concentration of hydrogen ions in the test solution.

4. The sensor system of claim 1, wherein the redox species comprises a redox active species that is sensitive to hydrogen ion concentration and thus produces a peak voltage output dependent upon a pH of a local environment and is configured to set a pH of the test solution local to the monitoring electrode when the monitoring electrode is contacted with a solution.

5. The sensor system of claim 4, wherein the redox species comprises an acid, a base, acidic moieties and/or basic moieties.

6. The sensor system of claim 4, wherein the redox species comprises salicylic acid, an amine derivate, anthraquinone, an anthraquinone derivative, a quinone, or a carbonyl modified electrode.

7. The sensor system of claim 1, suitable for sensing at least one property of the test solution when the test solution comprises at least one of a saline solution, a solution made to grow cells, a solution containing cells, a solution contained in a cell, a bodily fluid, and a mixture of a bodily fluid and a saline solution.

8. The sensor system of claim 1, wherein the test sensor comprises one of a solid-state electrochemical sensor, a glass electrode, an oxidation-reduction potential sensor and a glucose sensor.

9. The sensor system of claim 8, wherein the solid-state electrochemical sensor comprises a first working electrode and a second working electrode such that the sensor system may switch to using the second working electrode, when a signal produced by the first working electrode is below a threshold.

10. The sensor system of claim 1, further comprising one or more additional test sensors.

11. The sensor system of claim 10, wherein the one or more additional test sensors are at least one of a solid-state electrochemical sensor, a glass electrode, an oxidation-reduction potential sensor and a glucose sensor.

12. The sensor system of claim 1, adapted to sensing at least one property of the test solution when the test solution comprises an environmental solution or industrial effluent.

13. The sensor system of claim 1, wherein the test sensor comprises one of a solid-state electrochemical sensor, a glass electrode, or an oxidation-reduction potential sensor.

14. The sensor system of claim 13, wherein the test sensor is an ion selective electrode adapted to measure at least one of ammonia, potassium, sulfate, or nitrate.

15. The sensor system of claim 1, further comprising:
a voltammetric signal generator;
a signal processor; and
a counter electrode.

16. The sensor system of claim 15, wherein the voltammetric signal generator comprises a potentiostat.

17. A method for in-situ calibration of a sensor system comprising at least one electrode and configured to sense properties of a test solution, the method comprising:
applying a voltammetric signal to a monitoring electrode, wherein the monitoring electrode comprises one of a redox active species that is insensitive to solution composition and/or proton concentration or a redox active species that is configured to set a pH of the test solution local to the monitoring electrode;
processing one or more features in a voltammetric response generated in response to the applied voltammetric signal; and
using the one or more processed features to calibrate a test sensor of the sensor system, wherein the test sensor of the sensor system comprises at least one of a solid-state electrochemical sensor and/or a glass pH electrode and/or an oxidation-reduction potential sensor and/or a glucose sensor and/or a sensing electrode adapted to provide information regarding a composition of the test solution.

18. The method of claim 17, wherein the voltammetric signal comprises a voltammetric sweep applied across the monitoring electrode and at least one of a reference electrode and a counter electrode.

19. The method of claim 17, further comprising:
applying a voltammetric sweep between the monitoring electrode and the test sensor of the sensor system to generate a voltammetric sensor electrode response.

20. The method of claim 19, wherein a voltammetric sensor electrode response generated by the voltammetric sweep is processed to determine operating characteristics of the sensor system.

* * * * *